US008761074B2

(12) United States Patent
Blankenship et al.

(10) Patent No.: US 8,761,074 B2
(45) Date of Patent: Jun. 24, 2014

(54) RELAY BACKHAUL IN WIRELESS COMMUNICATION

(75) Inventors: Yufei Blankenship, Kildeer, IL (US); Jianmin Lu, San Diego, CA (US); Zhongfeng Li, Shanghai (CN)

(73) Assignee: Futurewei Technologies, Inc., Plano, TX (US)

( * ) Notice: Subject to any disclaimer, the term of this patent is extended or adjusted under 35 U.S.C. 154(b) by 569 days.

(21) Appl. No.: 12/861,503

(22) Filed: Aug. 23, 2010

(65) Prior Publication Data

US 2011/0051654 A1 Mar. 3, 2011

Related U.S. Application Data

(60) Provisional application No. 61/237,575, filed on Aug. 27, 2009.

(51) Int. Cl.
*H04W 84/02* (2009.01)
(52) U.S. Cl.
USPC .......................................... 370/315
(58) Field of Classification Search
USPC .......................... 370/315, 329, 330
See application file for complete search history.

(56) References Cited

U.S. PATENT DOCUMENTS

2013/0039254 A1* 2/2013 Kim et al. ............... 370/312

FOREIGN PATENT DOCUMENTS

EP 2 372 927 A2 12/2009
WO WO 2009/009511 A2 1/2009

OTHER PUBLICATIONS

Motorola, R1-091348, Frame Structure and Signaling to Support Relay Operation, 3GPP TSG RAN1 #56bis, Mar. 23-27, 2009, pp. 1-3.*
U.S. Appl. No. 61/332,202, filed May 7, 2010, 24 pages.*
ZTE, R1-101821, 'Starting on R-PDSCH', Apr. 12-16, 2010, TSG-RAN WG1 #60bis, p. 1-3.*
International Search Report and Written Opionion for Application No. PCT/CN2010/076402, mailed Dec. 2, 2010, 12 pages.
LG Electronics, "Resource Allocation and Downlink Control Channel Structure for Relay Backhaul Link," 3GPP TSG RAN WG1 Meeting #56bis, R1-091194, Seoul, Korea, Mar. 23-27, 2009, 7 pages.
Huawei, "Consideration on R-PDCCH for Type 1 relays," 3GPP TSG RAN WG1 Meeting #57bis, R1-092375, Los Angeles, USA, Jun. 29-Jul. 3, 2009, 4 pages.
"$3^{rd}$ Generation Partnership Project; Technical Specification Group Radio Access Network; Evolved Universal Terrestrial Radio Access (E-UTRA) Radio Resource Control (RRC); Protocol specification (Release 8)," 3GPP TS 36.331 V8.5.0, Mar. 2009, 204 pages.
"$3^{rd}$ Generation Partnership Project; Technical Specification Group Radio Access Network; Further Advancements for E-UTRA Physical Layer Aspects (Release 9)," 3GPP TR 36.814 V1.5.0, Nov. 2009, 53 pages.
Huawei, "Considerations on R-PDCCH for Type 1 relays," 3GPP TSG RAN WG1 Meeting #57bis R1-092375, Los Angeles, USA, Jun. 29-Jul. 3, 2009, 4 pages.

(Continued)

*Primary Examiner* — Melvin Marcelo
(74) *Attorney, Agent, or Firm* — Slater & Matsil, L.L.P.

(57) ABSTRACT

In one embodiment, a method for wireless communication includes transmitting a first system information for a subframe structure from a controller to a relay node. The first system information includes radio resource configuration for a downlink backhaul link. The subframe structure includes a physical downlink control channel (PDCCH) region for user equipments and a separate relay physical downlink control channel (R-PDCCH) region for relay nodes.

28 Claims, 5 Drawing Sheets

(56) References Cited

OTHER PUBLICATIONS

Huawei, "R-PDCCH Design," 3GPP TSG RAN WG1 Meeting #58 R1-093042, Shenzhen, China, Aug. 24-28, 2009, 6 pages.

Huawei, "Search Space for R-PDCCH," 3GPP TSG RAN WG1 Meeting #62 R1-104511, Madrid, Spain, Aug. 23-27, 2010, 3 pages.

Huawei, "Starting time of R-PDCCH&R-PDSCH," 3GPP TSG RAN WG1 Meeting #61 R1-103118, Montreal, Canada, May 10-14, 2010, 2 pages.

Huawei, "Un HARQ timing for Uplink FDD," 3GPP TSG RAN WG1 Meeting #62 R1-104307, Madrid, Spain, Aug. 23-27, 2010, 6 pages.

Nortel, "Control Channel and Data Channel Design for Relay Link in LTE-Advanced," 3GPP TSG-RAN Working Group 1 Meeting #56 R1-090753, Athens, Greece, Feb. 9-13, 2009, 10 pages.

Samsung, "Discussion on Backhaul Control Design for Type-I L3 Relay," 3GPP TSG RAN WG1 Meeting #57 R1-091871, San Francisco, USA, May 4-8, 2009, 6 pages.

"$3^{rd}$ Generation Partnership Project; Technical Specification Group Radio Access Network; Evolved Universal Terrestrial Radio Access (E-UTRA); Radio Resource Control (RRC); Protocol specification (Release 8)," 3GPP TS 36.331 V8.6.0 (Jun. 2009), 207 pages.

"$3^{rd}$ Generation Partnership Project; Technical Specification Group Radio Access Network; Feasibility study for Further Advancments for E-UTRA (LTE-Advanced) (Release 9)," 3GPP TR 36.912 V0.1.0 (Mar. 2009), 8 pages.

"$3^{rd}$ Generation Partnership Project; Technical Specification Group Radio Access Network; Further Advancements for E-UTRA Physical Layer Aspects (Release 9)," 3GPP TR 36.814 V0.4.1 (Feb. 2009), 31 pages.

European Search Report for European Application No. 10811286.3, Sep. 28, 2012, 10 pages.

European Office Action for Application No. 10 811 286.3-1860, mailed Jul. 4, 2013, 4 pgs.

* cited by examiner

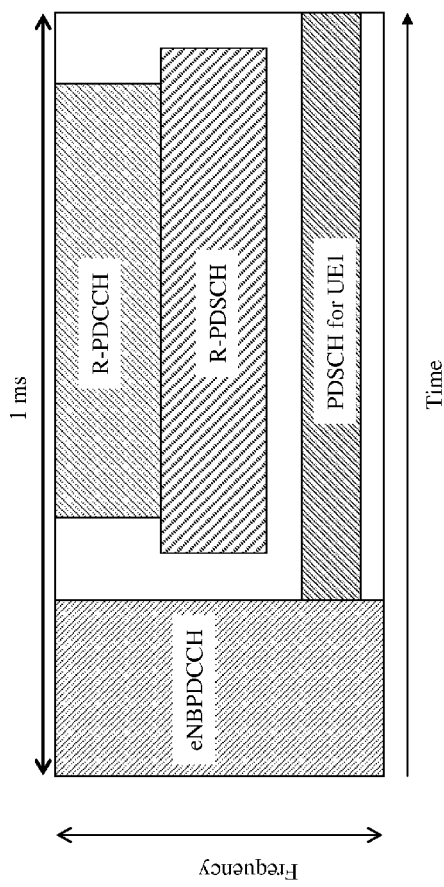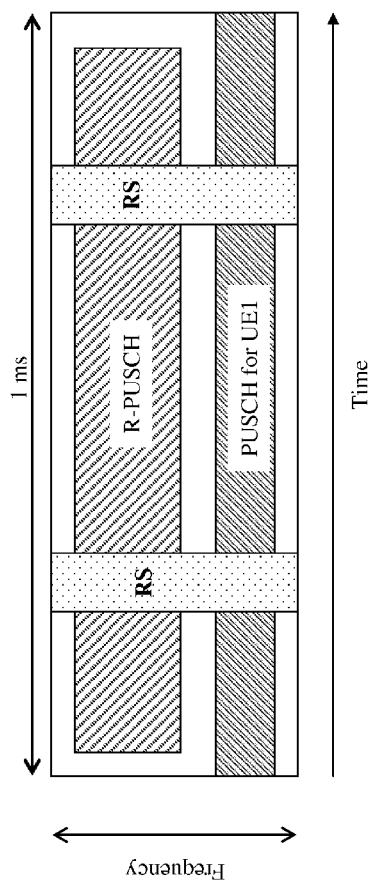
Fig. 4
Fig. 5

RELAY BACKHAUL IN WIRELESS COMMUNICATION

This application claims the benefit of U.S. Provisional Application No. 61/237,575, filed on Aug. 27, 2009, entitled "Relay Backhaul in Wireless Communication," which application is hereby incorporated herein by reference.

TECHNICAL FIELD

The present invention relates generally to wireless communication, and more particularly to relay backhaul in wireless communication.

BACKGROUND

Wireless communication systems are widely used to provide voice and data services for multiple users using a variety of access terminals such as cellular telephones, laptop computers and various multimedia devices. Such communications systems can encompass local area networks, such as IEEE 801.11 networks, cellular telephone and/or mobile broadband networks. The communication system can use one or more multiple access techniques, such as Frequency Division Multiple Access (FDMA), Time Division Multiple Access (TDMA), Code Division Multiple Access (CDMA), Orthogonal Frequency Division Multiple Access (OFDMA), Single Carrier Frequency Division Multiple Access (SC-FDMA) and others. Mobile broadband networks can conform to a number of system types or partnerships such as, General Packet Radio Service (GPRS), 3rd-Generation standards (3G), Worldwide Interoperability for Microwave Access (WiMAX), Universal Mobile Telecommunications System (UMTS), the 3rd Generation Partnership Project (3GPP), Evolution-Data Optimized EV-DO, or Long Term Evolution (LTE).

Some systems, such as LTE, strive to serve densely populated areas with very high data rates. One way in which an LTE network can provide dense coverage and high data capacity in a cost effective manner is to utilize Relay Nodes (RNs), which function as base stations to user devices, but do not have wired backhaul connections as base stations do. Instead, the RN communicates wirelessly with an LTE base station (eNB) via a standard LTE radio link. Base station (BS) is also commonly referred to as evolved nodeB (eNB), base transceiver station, controller, access point (AP), access network (AN), and so forth, while a user device or user equipment (UE) may also be commonly referred to as mobile station (MS), access terminal (AT), subscribers, subscriber stations, terminals, mobile stations, and so on.

Because a RN behaves as both a UE and an eNB, the RN requires significant system information that must be wirelessly transmitted for successful operation. Therefore, one of the challenges in incorporating relay nodes involves transferring such information to the RNs.

SUMMARY OF THE INVENTION

These and other problems are generally solved or circumvented, and technical advantages are generally achieved, by illustrative embodiments of the present invention.

In accordance with an embodiment of the present invention, a method for wireless communication comprises a method for wireless communication includes transmitting system information for a subframe structure from a controller to a relay node. The first system information includes radio resource configuration for a downlink backhaul link. The subframe structure includes a physical downlink control channel (PDCCH) region for user equipments and a separate relay physical downlink control channel (R-PDCCH) region for relay nodes.

In another embodiment of the present invention, a method for wireless communication comprises transmitting a first system information for a subframe structure from a controller to a first relay node. The first system information comprises radio resource configuration for a uplink backhaul link. The subframe structure comprises a relay physical uplink shared channel (R-PUSCH) for relay nodes and a physical uplink shared channel (PUSCH) for user equipments. The R-PUSCH and the PUSCH are frequency division multiplexed within the subframe structure.

In yet another embodiment of the present invention, a method for wireless communication comprises unicasting a first system information for a subframe structure from a donor base station to a relay node using radio resource control signaling. The first system information comprises radio resource configuration for a first downlink backhaul link. The subframe structure comprises a physical downlink control channel (PDCCH) region for user equipments and a separate relay physical downlink control channel (R-PDCCH) region for relay nodes. The subframe structure further comprises a relay physical downlink shared channel (R-PDSCH) region.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 4 illustrates another embodiment for a downlink transmission;

FIG. 5 illustrates an embodiment for an uplink transmission;

Corresponding numerals and symbols in the different figures generally refer to corresponding parts unless otherwise

DETAILED DESCRIPTION OF ILLUSTRATIVE EMBODIMENTS

The making and using of various embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

A Relay Node (RN) is considered as a tool to improve, e.g., the coverage of high data rates, group mobility, temporary network deployment, the cell-edge throughput and/or to provide coverage in new areas. The RN is wirelessly connected to a wireless communications network via a donor cell (also referred to as a donor enhanced Node B (donor eNB or D-eNB)), and the link between RN and the donor eNB is referred to as the backhaul link. The RN may serve as an eNB to one or more User Equipment (UE), and the link between the RN and the UE is referred to as the access link.

The RN may appear identical to an eNB to the UE that is being served by the RN. Similar to an eNB, the RN schedules uplink (UL) and downlink (DL) transmissions to the UE over an access link between the RN and the UE. When a UE is served by more than one RN, Cooperative Multipoint Transmission/Reception (CoMP) may be made by multiple RNs, which may help to provide cooperative gain and improve the performance of the UE.

Figure 1:
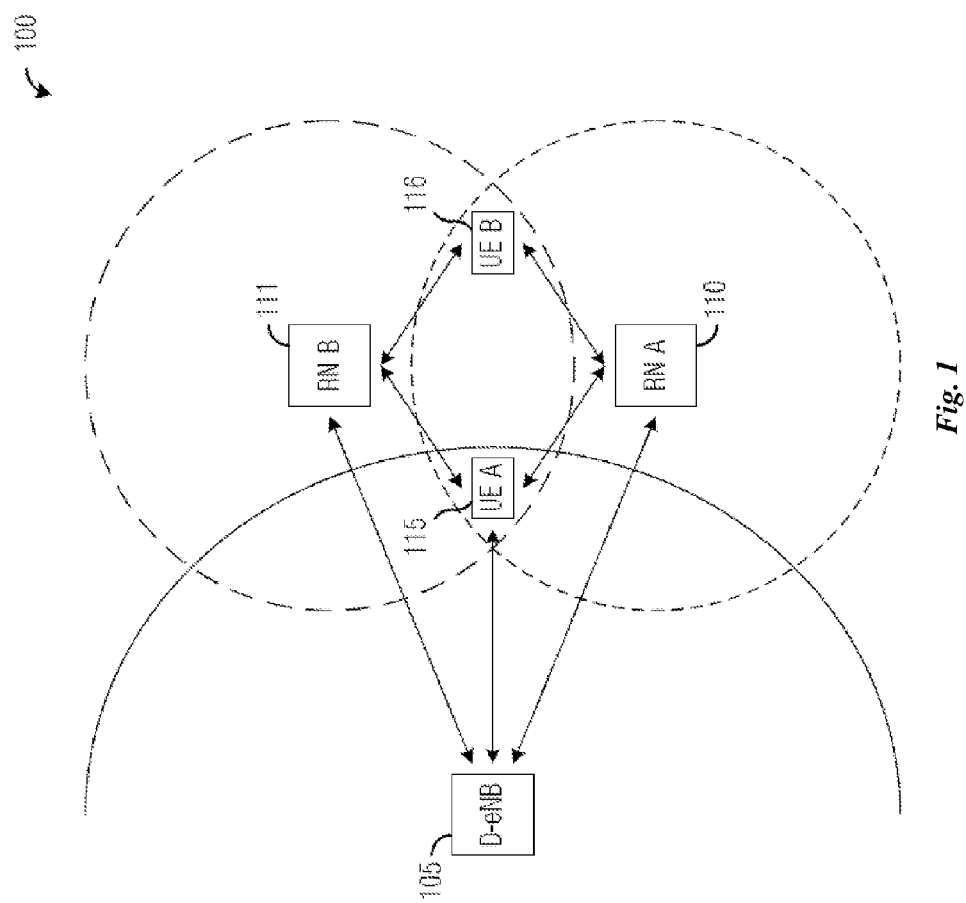
FIG. 1 illustrates a wireless communications system in accordance with embodiments of the invention.

FIG. 1 illustrates a wireless communications system 100 in accordance with embodiments of the invention. Wireless communications system 100 includes a D-eNB 105, a RN A 110, and a RN B 111. RN A 110 and RN B 111 may be connected over a wireless backhaul link to D-eNB 105. The wireless connection between D-eNB 105 and RN A 110 (or RN B 111) may be referred to as a backhaul link. RN A 110 and RN B 111 belong to D-eNB 105 and may receive transmission grants (which assigns network resources) from D-eNB 105.

Wireless communications system 100 also includes UE A 115 and UE B 116. UE A 115 and UE B 116 may be wirelessly connected to both RN A 110 and RN B 111. The wireless connection between a UE and a RN (e.g., UE A 115 and RN A 110, UE B 116 and RN B 111, UE A 115 and RN B 111, UE B 116 and RN A 110, etc.) may be referred to as an access link. Furthermore, in addition to access links, a UE may be wirelessly connected to a D-eNB (e.g., UE A 115 and D-eNB 105).

The connection between the network and the relay node can be in-band, in which the network-to-relay link share the same band with direct network-to-UE links within the donor cell. LTE Rel-8 UEs should be able to connect to the donor cell in this case. Alternatively, the connection can be outband, in which case the network-to-relay link does not operate in the same band as direct network-to-UE links within the donor cell.

With respect to the knowledge in the UE, relays can be classified as transparent, in which case the UE is not aware of whether or not it communicates with the network via the relay. Alternatively, relays can be non-transparent, in which case the UE is aware of whether or not it is communicating with the network via the relay.

Type-1 relay nodes are part of LTE-Advanced. A type-1 relay node is an in-band relaying node characterized by the following. Each type-1 control cell appears to a UE as a separate cell distinct from the donor cell. The cells have their own Physical Cell ID (defined in LTE Rel-8) and the relay node transmits its own synchronization channels, reference symbols, etc. In the context of single-cell operation, the UE shall receive scheduling information and HARQ feedback directly from the relay node and send its control channels (SR/CQI/ACK) to the relay node. The type-1 RN is backward compatible e.g., appears as a Rel-8 eNB to Rel-8 UE. To LTE-Advanced UEs, type-1 relay node must appear different from Rel-8 eNB to allow for further performance enhancement.

Therefore, in order to allow in-band backhauling of the relay traffic on the relay-eNB link, some resources in the time-frequency space are set aside for this link and cannot be used for the access link on the respective node.

For in-band relaying, the eNB-to-relay link operates in the same frequency spectrum as the relay-to-UE link. Due to the relay transmitter causing interference to its own receiver, simultaneous eNB-to-relay and relay-to-UE transmissions on the same frequency resource may not be feasible unless sufficient isolation of the outgoing and incoming signals is provided, e.g., by means of specific, well separated and well isolated antenna structures. Similarly, at the relay node it may not be possible to receive UE transmissions simultaneously with the relay transmitting to the eNodeB.

Figure 2:
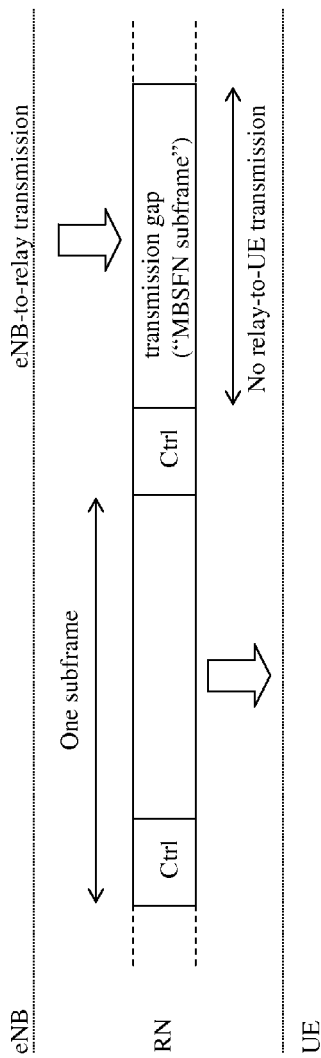
FIG. 2 illustrates a relay-to-UE communication using normal subframes and eNB-to-relay communication using MBSFN subframes.

The interference problem is handled by operating the relay node such that the relay node is not transmitting to terminals when it is supposed to receive data from the donor eNB, i.e., to create "gaps" in the relay-to-UE transmission. These "gaps" during which terminals (including Rel-8 terminals) are not supposed to expect any relay transmission are created by configuring multicast broadcast single frequency network approach (MBSFN) subframes as illustrated for example in FIG. 2. As illustrated in FIG. 2, relay-to-eNB transmissions can be facilitated by not allowing any terminal-to-relay transmissions in some subframes. FIG. 2 illustrates an example of relay-to-UE communication using normal subframes (left) and eNB-to-relay communication using MBSFN subframes (right).

Figure 3:
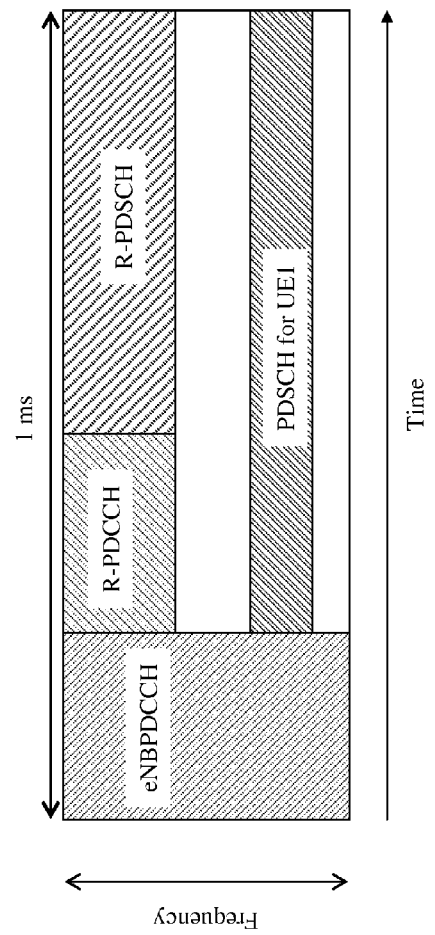
FIG. 3 illustrates a frame structure for a downlink transmission from an eNB to a RN in accordance with an embodiment of the invention.

FIG. 3 illustrates a frame structure for a downlink transmission from an eNB to a RN in accordance with embodiments of the invention. The downlink subframe includes a physical downlink control channel (PDCCH) and a physical downlink shared channel (PDSCH). The PDSCH is shown to include data intended for UE1, which is served directly by the eNB. Since the DL subframe is also a DL relay backhaul link, the subframe includes some REs dedicated for use as the DL relay backhaul link, such as relay-physical downlink control channel (R-PDCCH) and relay-physical downlink shared channel (R-PDSCH). Here, PDCCH is used for transmitting downlink control information from the eNB to a regular UE. PDSCH is used for transmitting downlink data packets from the eNB to a regular UE. R-PDCCH is used for transmitting downlink control information from the eNB to a RN for the backhaul link. R-PDSCH is for transmitting downlink data packets from the eNB to a RN for the backhaul link.

In 3GPP LTE/LTE-A, each subframe is composed of a certain number of OFDM symbols in time, and a number of OFDM subcarriers in frequency. The resource in a subframe is allocated in the unit of a resource block (RB). A RB comprises a number of OFDM symbols in time, and 12 subcarriers in frequency. The RBs are allocated in a pair, called a RB pair. Therefore, for simplicity, the RB pair allocation is referred to as RB allocation.

System information delivery by eNB for relay is now described in accordance with embodiments of the invention.

To enable the operation of relay nodes subordinate to a donor eNB, some additional system information is needed for the relay node (RN), on top of regular system information.

Additional information required by the relay node in downlink transmissions is described in various embodiments of the invention. For radio resource configuration, the additional information may include the number of OFDM symbols used for Physical Downlink Control Channel (PDCCH) ($n_0$), R-PDCCH ($n_1$), the number of resource blocks (RBs) used for R-PDCCH, the index of starting RBs used for R-PDCCH, and/or the type of R-PDCCH that may be distributed or localized. Because R-PDSCH may not start at the same OFDM symbol as R-PDCCH, the number of OFDM symbols used for R-PDSCH may be provided by defining the position of the starting symbol and the position of the ending symbol of R-PDSCH. Similarly, the number of OFDM symbols used for R-PDCCH may be provided by defining the starting symbol and the ending symbol of R-PDCCH. In one embodiment, the R-PDCCH and the R-PDSCH end at the same OFDM symbol and this information (e.g., position of the ending symbol) only needs to be provided once.

In one or more embodiments, the number of OFDM symbols used for PDCCH $n_0$ may include a value. In one case, a value of $n_0$ may be 3. Similarly, in one case, a value for the number of OFDM symbols used for R-PDCCH $n_1$ may be 2. In general, the radio resource configuration may include information indicating a number of OFDM symbols used for PDSCH, and/or information indicating a number of OFDM symbols for the R-PDCCH.

As illustrated in FIG. 3, the subframe comprises a separate PDCCH region and a R-PDCCH region. The relay data packet (R-PDSCH) and the regular UE data packet (PDSCH) share the same subframe, for example, in a frequency-division multiplexing (FDM) fashion.

The timing information about the downlink backhaul resources may also be included in various embodiments. The timing information may include the time that these parameters are going to be effective. This time can be provided by specifying a radio frame number (SFN), and/or a subframe number. The time information may also include the period of the downlink backhaul allocation (e.g., how frequently the subframe can be used for downlink backhaul), and/or a bitmap to indicate the subframes that are available for downlink backhaul.

Additional information for relay node in uplink is described in various embodiments of the invention. Radio resource configuration information may include the number of RBs used for uplink backhaul, and/or the index of starting RB used for uplink backhaul.

The timing information about the uplink backhaul resources may include the time that the parameters are going to be effective. This time can be provided by specifying a radio frame number (SFN), and/or a subframe number. The timing information may also comprise the period of the uplink backhaul allocation (e.g., how frequently the subframe can be used for downlink backhaul), and/or a bitmap to indicate the subframes that are available for uplink backhaul.

In various embodiments, the above system information is delivered to RN from DeNB (donor cell) through either the broadcasting way or unicasting way. For example, the radio resource configuration and timing information for each RN might be different. Consequently, the said parameters can be defined for each RN individually, and this information is sent to each RN individually via unicast. This scenario is possible if the frequency selective R-PDCCH is adopted.

As described in 3GPP TS 36.331 V8.5.0 (2009-03), Evolved Universal Terrestrial Radio Access (E-UTRA); Radio Resource Control (RRC); Protocol specification, which is incorporated by reference herein, radio resource control (RRC) signalling may be used when unicasting is desired. Therefore, in one or more embodiments, the system information parameters are transmitted to each RN from the donor eNB using radio resource control (RRC) signalling.

On the other hand, the radio resource configuration and timing information can be the composite information for all RNs. For example, the radio resource information may indicate the search space that all RNs' control information may be located. In this scenario, this information may be broadcasted by incorporating them into a SIB (System Information Block). For example, a SIB 13 can be defined for the relay node.

Since RN cannot read the regular PDCCH once it is registered, it cannot read the regular SIBs broadcasted by DeNB. As a consequence, in various embodiments, those parameters have to be conveyed through the relay backhaul channels, as R-PDCCH or R-PDSCH. In one embodiment, eNB contains all the necessary SIBs in the payload of R-PDSCH. In another embodiment, eNB defines a new SIB which contains all the necessary information, which contains, for example, a configuration defining how relay will perform its own cell selection and measurement. Consequently and advantageously, the UEs served by the RN can go to sleep during these subframes to save power, rather than being forced to perform unnecessary measurement.

In various embodiments, sets of downlink and uplink information are defined. Various means to convey such information from eNB to relay nodes are designed in embodiments of the invention.

FIG. 4 illustrates a subframe structure for a downlink transmission from an eNB to a RN in accordance with an embodiment of the invention.

Similar to the embodiment described with respect to FIG. 3, the location of the R-PDCCH and the R-PDSCH are communicated. For example, the number of OFDM symbols used for Physical Downlink Control Channel (PDCCH), the number of OFDM symbols used for R-PDCCH, the number of resource blocks (RBs) used for R-PDCCH, the index of starting RBs used for R-PDCCH, and/or the type of R-PDCCH where the type may be distributed or localized. However, in some embodiments, the starting RB may be predetermined, and hence this may not be necessary.

As in FIG. 3, the subframe comprises a separate PDCCH region and R-PDCCH region. The relay data packet (carried on R-PDSCH) and regular UE data packet (carried on PDSCH) share the same subframe such that the R-PDSCH uses different frequency than the UE data packet (PDSCH) (i.e., FDM fashion).

FIG. 5 illustrates a subframe structure for an uplink transmission from a RN to an eNB in accordance with an embodiment of the invention.

In various embodiments, the relay data packet (carried on relay physical uplink shared channel R-PUSCH) and the regular data packet (carried on physical uplink shared channel PUSCH) share the same subframe. In other words, R-PUSCH and PUSCH are not separated in time but only separated in frequency (i.e., frequency division multiplexing).

Radio resource configuration information and timing information about the uplink backhaul resources may be transmitted to the RN from the donor eNB. In one embodiment, the radio resource configuration information may include the number of RBs used for the uplink backhaul, and/or the index of starting RB used for the uplink backhaul. In one embodiment, the number of SC-FDMA symbols used for R-PUSCH may be communicated from the donor eNB to the RN. The timing information about the uplink backhaul resources may include the time that the parameters are going to be effective. This time can be provided by specifying a radio frame number (SFN), and/or a subframe number. The timing information may also comprise the period of the uplink backhaul allocation, and/or a bitmap to indicate the subframes that are available for uplink backhaul.

Figure 6:
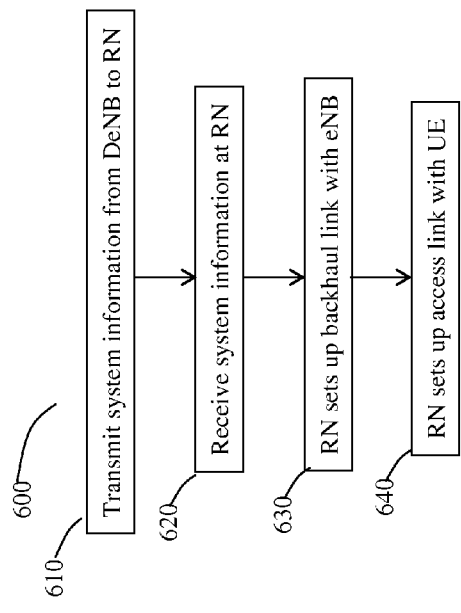
FIG. 6 illustrates operations at the relay node and the eNB in accordance with an embodiment of the invention.

FIG. 6 illustrates operations at the relay node and the eNB in accordance with embodiments of the invention.

Referring to FIG. 6, step 610, a donor eNB transmits, e.g., unicasting or broadcasting, first system information to a first RN. The first system information was described above using FIGS. 3-5 and may be for uplink and/or downlink transmission. The first RN receives the first system information (step 620) and, e.g., determines the subframe structure to be used for the uplink and/or downlink communication. The first RN sets up a backhaul link with the eNB for the transmission (step 630), and may set up both downlink and uplinks. For example, the first RN may communicate with the donor eNB using subframes having the subframe structure. The first RN may also use the first system information to set up an access link with the UE (step 640). Communication between the UE and the eNB progresses through the established backhaul link and the access link.

In one or more embodiments, a second system information is transmitted from the donor eNB to the first relay node. In one embodiment, unicasting using radio resource control (RRC) signaling is used to transmit the second system information. The second system information comprises radio resource configuration for the same downlink backhaul link established previously (e.g., in steps 630 and 640). In various embodiments, the second system information is transmitted after the first system information. In one or more embodiments, the relay node replaces the first system information with the second system information, and the donor eNB and the first relay node subsequently applies the second system information in constructing the downlink and uplink subframes for the backhaul link transmission.

In various embodiments, the donor eNB may further transmit a third system information to a second relay node. The third system information may comprise radio resource configuration for a second downlink backhaul link or a second uplink backhaul link which are used in backhaul communication between the donor eNB and the second relay node.

Figure 7:
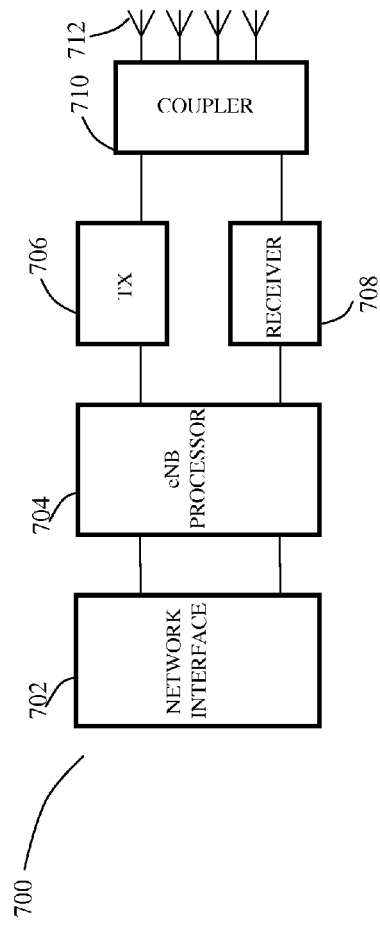
FIG. 7 illustrates a block diagram of an embodiment of the eNB.

A block diagram of an embodiment eNB 700 is illustrated in FIG. 7. eNB 700 has eNB processor 704 coupled to transmitter (TX) 706 and receiver 708, and network interface 702. Transmitter 706 and receiver 708 are coupled to antenna 712 via coupler 710. The eNB processor 704 executes embodiment methods and algorithms as described above. In one or more embodiments, the embodiments of the invention may be implemented within the transmitter 706, the receiver 708, or as a separate circuitry. Some of the algorithms, such as to implement the operations illustrated in FIGS. 3-5, may also be implemented as software executed using the eNB processor 704. In one or more embodiments, the eNB 700 is configured to transmit system information to a relay node. The system information may comprise radio resource configuration and/or timing information for downlink or uplink backhaul relaying.

In an embodiment, eNB 700 is configured to operate in a LTE network using an OFDMA downlink and Discrete Fourier Transform Spread OFDM (DFT-SOFDM) uplink channels. In alternative embodiments, other systems, network types and transmission schemes can be used, for example, 1XEV-DO, IEEE 802.11, IEEE 802.15 and IEEE 802.16. The eNB 700 may have multiple transmitters, receivers and antennas to support MIMO operation.

Figure 8:
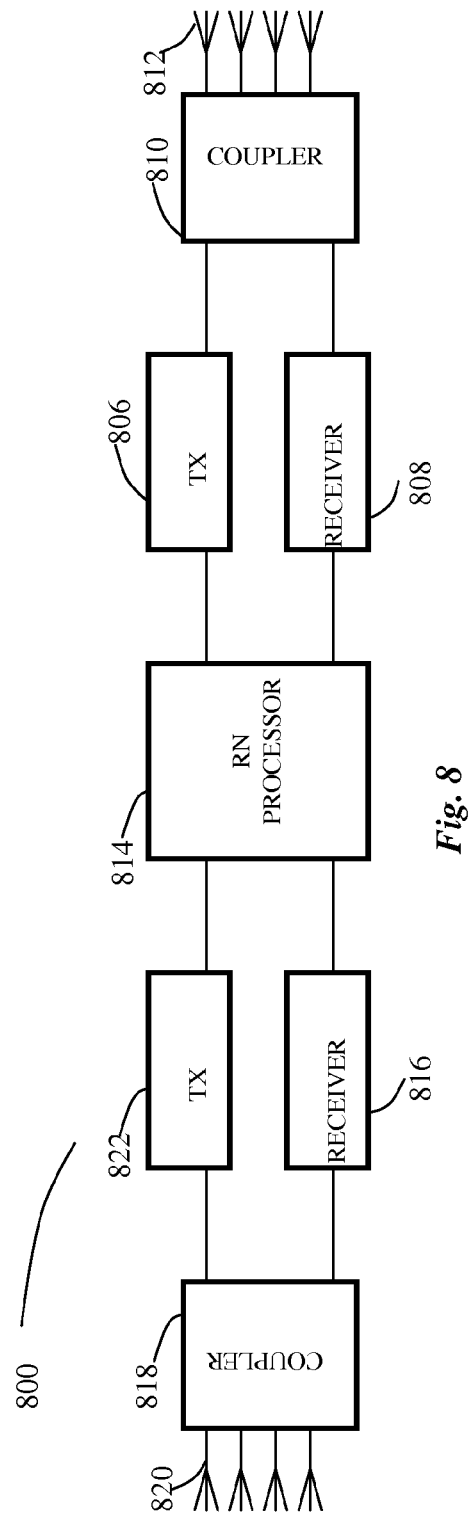
FIG. 8 illustrates a block diagram of an embodiment of the relay node.

A block diagram of an embodiment relay node 800 is illustrated in FIG. 8. Relay node 800 has donor antenna 820, which transmits to and from the eNB and is coupled to coupler 818, transmitter 822 and receiver 816. Service antenna 812, which transmits to and receives signals from user devices, is coupled to coupler 810, transmitter 806 and receiver 808. RN processor 814, which is coupled to both the donor and UE signal paths, controls the operation of relay node and implements embodiment algorithms described herein.

In one or more embodiments, the embodiments of the invention may be implemented within the transmitter 822, the receiver 816, or as a separate circuitry. Some of the algorithms, such as to implement the operations illustrated in FIGS. 3-5, may also be implemented as software executed using the RN processor 814. In one or more embodiments, the relay node 800 is configured to receive system information from a donor base station. The system information may comprise radio resource configuration and/or timing information for downlink or uplink backhaul relaying. The relay node 800 uses the system information to set up a subordinate relay node for relaying.

In an embodiment of the present invention, relay node 800 is configured to operate in a LTE network using an OFDMA downlink channels divided into multiple subbands, and Single Carrier Frequency Division Multiple Access (SC-FDMA) uplink divided into multiple subbands. In alternative embodiments, other systems, network types and transmission schemes can be used.

In one embodiment, a method for wireless communication comprises transmitting system information for a subframe structure from a donor base station to a relay node. The system information comprises radio resource configuration and/or timing information for downlink backhaul relaying. Subframes having the subframe structure are used for the downlink backhaul transmission. The downlink backhaul refers to the transmission link from the donor base station to the relay node. The subframe structure comprises a physical downlink control channel (PDCCH) region and a separate relay physical downlink control channel (R-PDCCH) region.

In another embodiment, a method for wireless communication comprises transmitting system information for a subframe structure from a donor base station to a relay node. The system information comprises radio resource configuration and/or timing information for uplink backhaul transmission. The uplink backhaul refers to the transmission link from the relay node to the donor base station. Subframes having the subframe structure are used for the uplink backhaul transmission. The subframe structure comprises a relay physical uplink shared channel R-PUSCH and a physical uplink shared channel PUSCH. The R-PUSCH and the PUSCH are not separated in time but only in frequency within the subframe structure. In other words, the R-PUSCH and the PUSCH are frequency division multiplexed within the subframe structure In yet another embodiment, a method for wireless communication comprises unicasting a first system information for a subframe structure from a donor base station to a relay node using radio resource control signaling. The first system information comprises radio resource configuration and/or timing information for downlink backhaul relaying. Subframes having the subframe structure are used for the downlink backhaul relaying. The subframe structure comprises a physical downlink control channel (PDCCH) region and a separate relay physical downlink control channel (R-PDCCH) region. The subframe structure comprises a relay physical downlink shared channel (R-PDSCH) region and a separate physical downlink shared channel (PDSCH) region.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for wireless communication comprising: using radio resource control (RRC) signaling, transmitting a first system information for a subframe structure from a controller to a relay node, the first system information comprising radio resource configuration for a downlink backhaul link, wherein the subframe structure comprises a physical downlink control channel (PDCCH) region for user equipments, a separate relay physical downlink control channel (R-PDCCH) region for relay nodes, a separate relay physical downlink shared channel (R-PDSCH) for relay nodes, wherein the radio resource configuration indicated using RRC signaling comprises information indicating a number of OFDM symbols used for the R-PDSCH.

2. The method of claim 1, wherein the subframe structure comprises a physical downlink shared channel (PDSCH) for user equipments.

3. The method of claim 1, further comprising using a subframe having the subframe structure for a downlink backhaul transmission.

4. The method of claim 1, further comprising receiving the first system information at the relay node, wherein the relay node uses the first system information to set up the downlink backhaul link from the controller to the relay node.

5. The method of claim 1, wherein the radio resource configuration comprises information indicating a number of OFDM symbols used for the R-PDCCH.

6. The method of claim 1, wherein the radio resource configuration comprises information indicating a number of resource blocks for the R-PDCCH.

7. The method of claim 1, wherein the controller further transmits timing information of the downlink backhaul link to the relay node.

8. The method of claim 7, wherein the timing information comprises a duration of time during which the first system information is valid, and/or a period of the downlink backhaul link.

9. The method of claim 7, wherein the timing information comprises a bitmap to indicate the subframes available for the downlink backhaul link.

10. The method of claim 1, wherein the first system information is transmitted using unicasting.

11. The method of claim 1, further comprising transmitting a second system information from the controller to a second relay node.

12. A method for wireless communication comprising: using radio resource control (RRC) signaling, transmitting a first system information for a subframe structure from a controller to a first relay node, the first system information comprising radio resource configuration for a uplink backhaul link, wherein the subframe structure comprises a relay physical uplink shared channel (R-PUSCH) for relay nodes and a physical uplink shared channel (PUSCH) for user equipments, and wherein the R-PUSCH and the PUSCH are frequency division multiplexed within the subframe structure, wherein the radio resource configuration indicated using RRC signaling comprises information indicating a number of OFDM symbols used for the R-PUSCH; and
transmitting timing information of the uplink backhaul link from the controller to the first relay node, wherein the timing information comprises a duration of time during which the first system information is valid.

13. The method of claim 12, further comprising using subframes having the subframe structure for an uplink backhaul transmission.

14. The method of claim 12, wherein the radio resource configuration comprises information indicating a number of Discrete Fourier Transform Spread OFDM (DFT-SOFDM) symbols for the R-PUSCH.

15. The method of claim 12, wherein the first system information is transmitted through unicasting.

16. The method of claim 12, further comprising transmitting a second system information from the controller to a second relay node, the second system information comprising radio resource configuration for a second uplink backhaul link.

17. A method for wireless communication comprising: unicasting a first system information for a subframe structure from a donor base station to a relay node using radio resource control (RRC) signaling, the first system information comprising radio resource configuration for a first downlink backhaul link, wherein the subframe structure comprises a physical downlink control channel (PDCCH) region for user equipments, a separate relay physical downlink control channel (R-PDCCH) region for relay nodes, a separate relay physical downlink shared channel (R-PDSCH) for relay nodes, wherein the radio resource configuration indicated using RRC signaling comprises information indicating a number of OFDM symbols used for the R-PDSCH.

18. The method of claim 17, wherein the subframe structure further comprises a relay physical downlink shared channel (R-PDSCH) region, and wherein the R-PDCCH region and the R-PDSCH region follow a physical downlink control channel PDCCH region in the subframe structure.

19. The method of claim 17, further comprising: unicasting, using radio resource control (RRC) signaling, a second system information from the donor base station to the relay node using radio resource control signaling, the second system information comprising radio resource configuration for the same downlink backhaul link, wherein the second system information is transmitted after the first system information.

20. The method of claim 19, wherein the relay node replaces the first system information with the second system information.

21. The method of claim 17, further comprising: receiving the first system information at the relay node; and using subframes having the subframe structure for the downlink backhaul link.

22. The method of claim 17, wherein the first system information further comprises timing information for the downlink backhaul link.

23. A controller for wireless communication comprising:
a transmitter configured to transmit a first system information for a subframe structure from the controller to a relay node using radio resource control (RRC) signaling, the first system information comprising radio resource configuration for a downlink backhaul link, wherein the subframe structure comprises a physical downlink control channel (PDCCH) region for user equipments, a separate relay physical downlink control channel (R-PDCCH) region for relay nodes, a separate relay physical downlink shared channel (R-PDSCH) for relay nodes, wherein the radio resource configuration indicated using RRC signaling comprises information indicating a number of OFDM symbols used for the R-PDSCH.

24. A controller for wireless communication comprising:
a transmitter configured to transmit a first system information for a subframe structure from the controller to a first relay node using radio resource control (RRC) signaling, the first system information comprising radio resource configuration for a uplink backhaul link, wherein the subframe structure comprises a relay physical uplink shared channel (R-PUSCH) for relay nodes and a physical uplink shared channel (PUSCH) for user equipments, and wherein the R-PUSCH and the PUSCH are frequency division multiplexed within the subframe structure, wherein the radio resource configuration indicated using RRC signaling comprises information indicating a number of OFDM symbols used for the R-PUSCH; and
wherein the transmitter is further configured to transmit timing information of the uplink backhaul link from the controller to the first relay node, wherein the timing information comprises a duration of time during which the first system information is valid.

25. A donor base station in a wireless communication comprising:
transmitter configured to unicast a first system information for a subframe structure from the donor base station to a relay node using radio resource control (RRC) signaling, the first system information comprising radio resource configuration for a first downlink backhaul link, wherein the subframe structure comprises a physical downlink control channel (PDCCH) region for user equipments, a separate relay physical downlink control channel (R-PDCCH) region for relay nodes, a separate relay physical downlink shared channel (R-PDSCH) for relay nodes, wherein the radio resource configuration indicated using RRC signaling comprises information indicating a number of OFDM symbols used for the R-PDSCH.

26. A method for wireless communication comprising:
transmitting a first system information for a subframe structure from a controller to a relay node, the first system information comprising radio resource configuration for a downlink backhaul link, wherein the subframe structure comprises a physical downlink control channel (PDCCH) region for user equipments, a separate relay physical downlink control channel (R-PDCCH) region for relay nodes, a separate relay physical downlink shared channel (R-PDSCH) for relay nodes, wherein at least a part of the first system information is transmitted by broadcasting using a system information block (SIB), wherein the radio resource configuration comprises information indicating a number of OFDM symbols used for the R-PDSCH.

27. The method of claim 1, wherein the R-PDCCH and the R-PDSCH share the subframe structure at different frequency.

28. The method of claim 17, wherein the R-PDCCH and the R-PDSCH share the subframe structure at different frequency.

* * * * *